United States Patent [19]

Scott

[11] 3,929,106
[45] Dec. 30, 1975

[54] COMBUSTION CHAMBER ARRANGEMENT FOR ROTARY COMPRESSION-IGNITION I.C. ENGINES

[75] Inventor: William Murray Scott, Brighton, England

[73] Assignee: Rolls-Royce (1971) Limited, Crewe, England

[22] Filed: Oct. 1, 1974

[21] Appl. No.: 511,478

[30] Foreign Application Priority Data
Oct. 5, 1973 United Kingdom............... 46660/73

[52] U.S. Cl................................ 123/8.11; 123/8.11
[51] Int. Cl.² ........................................ F02B 53/04
[58] Field of Search.................. 123/8.09, 8.11, 8.13

[56] References Cited
UNITED STATES PATENTS

| | | |
|---|---|---|
| 3,244,154 | 4/1966 | Lohner .............................. 123/8.11 |
| 3,249,095 | 5/1966 | Hamada............................. 123/8.11 |
| 3,253,580 | 5/1966 | Eberhard et al................... 123/8.11 |
| 3,698,364 | 10/1972 | Jones................................ 123/8.09 |
| 3,703,885 | 11/1972 | Feller................................ 123/8.11 |

*Primary Examiner*—C. J. Husar
*Assistant Examiner*—Leonard Smith
*Attorney, Agent, or Firm*—Cushman, Darby & Cushman

[57] ABSTRACT

A rotary piston compression ignition internal combustion engine has a three sided rotor disposed in a two lobed epitrochoidal combustion chamber. A combustion recess is formed in each face of the rotor and the fuel injector of the engine is disposed so as to inject along the recess. The timing of injection is coordinated with the position of each recess as it passes the injector so as to minimize or prevent wetting of the recess walls with fuel.

6 Claims, 4 Drawing Figures

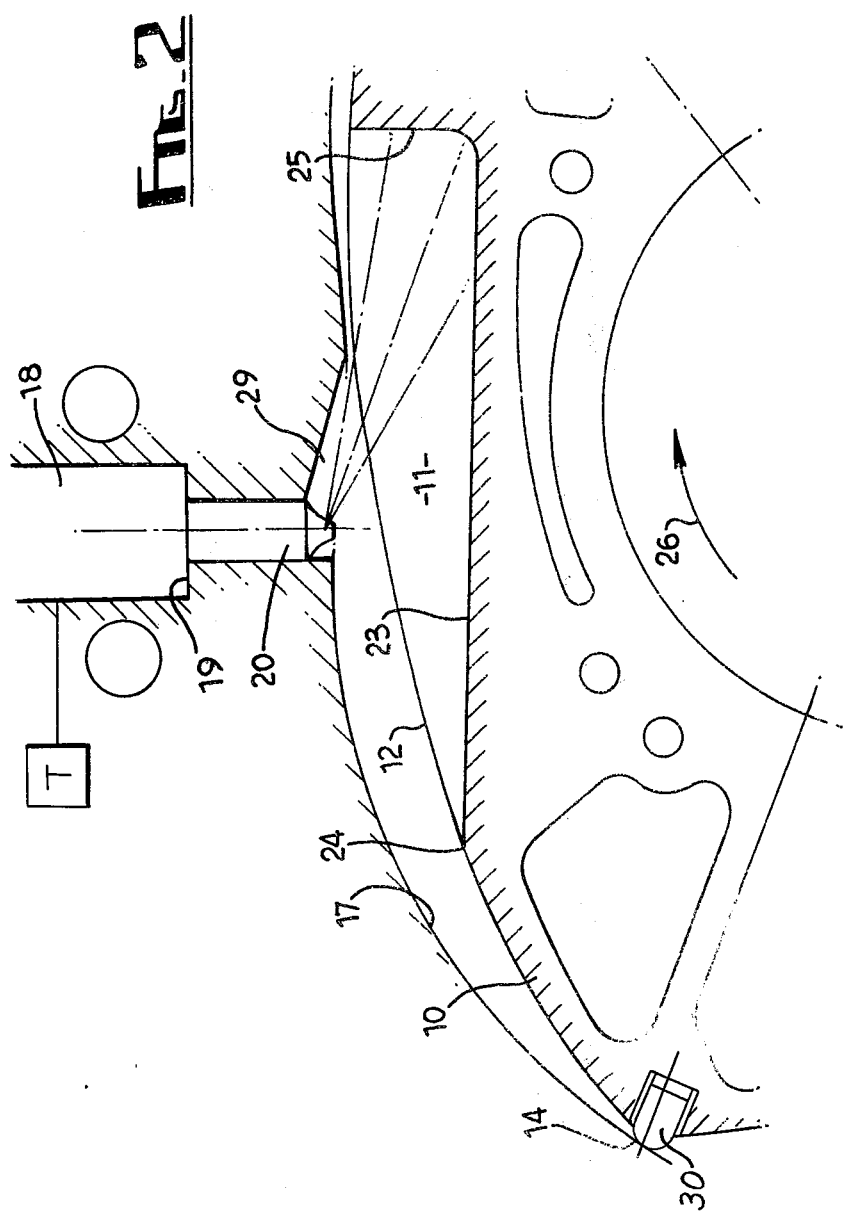

COMBUSTION CHAMBER ARRANGEMENT FOR ROTARY COMPRESSION-IGNITION I.C. ENGINES

This invention relates to rotary compression-ignition internal combustion engines employing liquid fuel injection for example rotary Diesel engines.

The combustion systems of direct-injection, or open-chamber compression-ignition piston engines employing liquid fuel injection fall into two general categories, namely (i) those in which fuel impinges on the combustion chamber wall and in which organised swirl is employed to achieve good mixing, and (ii) so-called quiescent combustion chambers in which the fuel is distributed mainly by the injector, and in the absence of organised air motion wall wetting is avoided.

Rotary Diesel engines in general do not fit into either of these categories. Because of the narrowness of the rotor and its housing in the axial direction, fuel spray paths in the axial direction are short and spray impingement on walls of the combustion space has been found inevitable. Moreover it has been found virtually impossible to generate sufficient air motion to effect good mixing under these wall-wetting conditions.

It is an object of the present invention to provide a combustion chamber arrangement in a rotary compression-ignition engine employing liquid fuel in which these difficulties are reduced or avoided, and in which wall-wetting may be largely avoided.

According to the present invention there is provided a rotary piston compression ignition internal combustion engine comprising a housing defining a main chamber comprising $n$ lobes, a shaft extending axially of the housing an $(n + 1)$ sided piston eccentrically mounted on the shaft and rotatable in the housing, a seal mounted at each apex formed between each pair of adjacent sides of the piston, a combustion recess formed in each flank of the rotor and means for injecting fuel into each recess disposed in the housing and arranged to inject one or more sprays of fuel into the combustion recess, the direction of injection of the spray or sprays being generally towards the leading end of the recess in the direction of rotation.

The invention may be carried into practice in various ways, but one specific embodiment will now be described by way of example only and with reference to the accompanying drawings, in which:

FIG. 2 is an enlarged view in section of one combustion recess in the rotor of the engine of FIG. 1;

Figure 1:
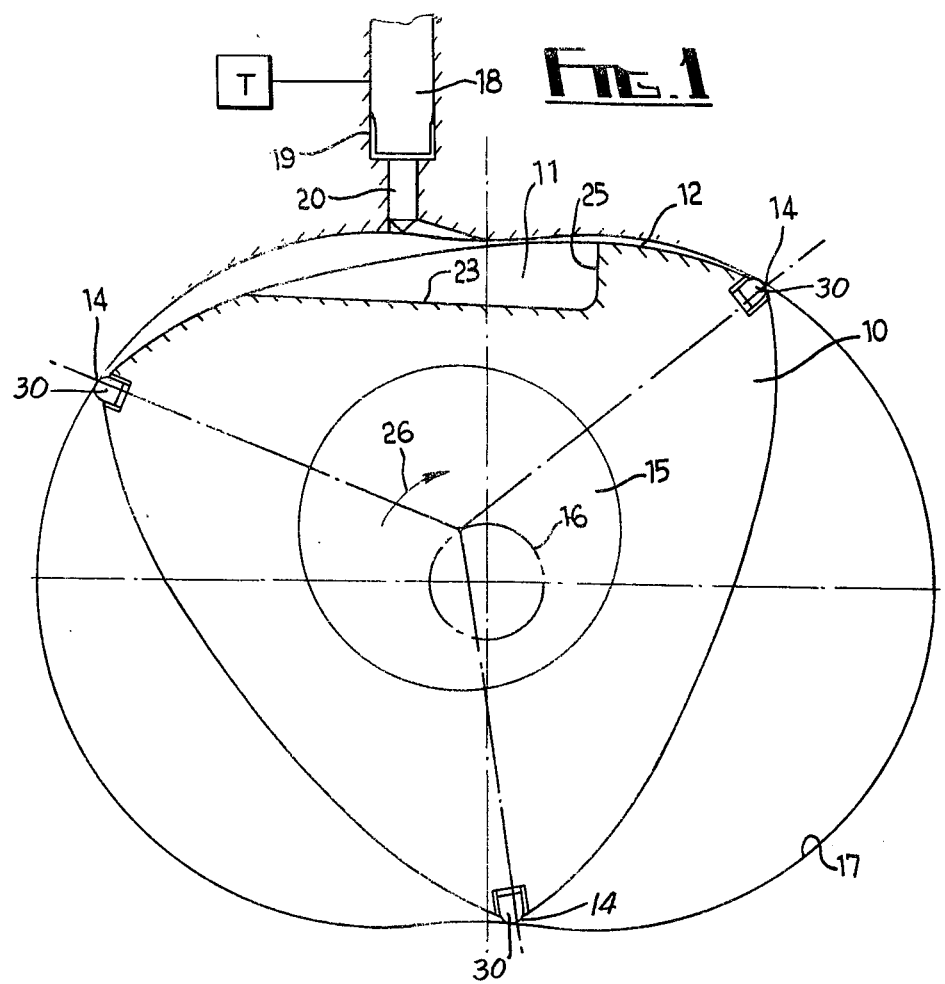
FIG. 1 is a view in section through the housing and rotor of a single-rotor rotary Diesel engine.

In the illustrated embodiment the rotor 10 of the engine is formed with a shallow recess 11 in the circumferential surface of each flank 12 of the three sided rotor, the recess extending over an area located approximately mid-way between the apices 14 of that flank. The rotor 10 is mounted on an eccentric 15 on the rotor shaft 16 and rotates in a housing 17. Each apex 14 of the rotor or piston 10 is provided with an outwardly urged apex seal 30. A fuel injector 18 is mounted in a recess 19 in the housing 17 as shown, with the tip of its injection nozzle just outside the internal surface of the housing.

Figure 2A:
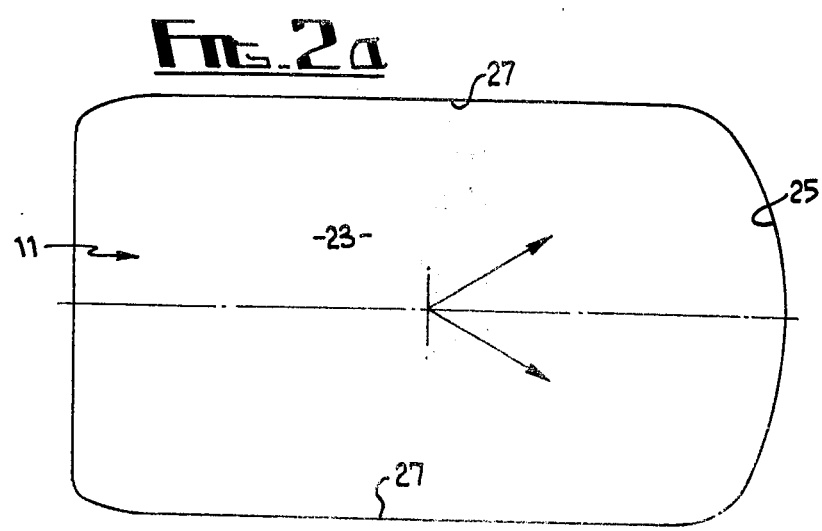
FIG. 2a is a view from above of the combustion recess shown in FIG. 2.

The recess 11 in each flank of the rotor constitutes a two-lobed epitrochoidal combustion chamber into which liquid fuel is sprayed by the injector and is ignited by compression as the rotor rotates. As shown, the recess 11 is of wedge-shaped form having a plane bottom wall 23 which intersects the circumferential surface of the rotor flank at 24, and an end wall 25 located at the leading end of the recess, with respect to the direction of rotation of the rotor 10 shown by the arrow 26. The leading end wall 25 is approximately perpendicular to the bottom wall 23, and also to the flank 12 of the rotor at its point of intersection therewith, and is concave as seen in the plan view of FIG. 2a. Thus the recess 11 is of progressively-increasing depth in the direction of rotation of the rotor, from zero at the intersection 24 to maximum depth at the end wall 25. The side walls 27 of the recess 11 are straight and parallel and are spaced inwardly from the sides of the rotor 10.

The injector 18 is provided with injection orifices in the tip of its nozzle 20 which are so arranged as to spray multiple jets 28 of liquid fuel into the recess 11 as the latter passes the injector 18, the sprayed jets all being directed predominantly forwardly into the recess 11 in the circumferential direction of rotation, and obliquely to the flank 12 of the rotor, as shown in the drawings. A cut-away 29 is formed in the wall of the housing 17 at the leading side of the injector nozzle 20 to allow this forward and oblique spraying of the fuel into the combustion recess 11. As shown, the relative position of the injector 18 and the advancing recess 11 and the injection timing controlled by timing means shown schematically at T are such that the leading end wall 25 of the recess 11 is moving away from the injector during the whole of the injection period. Thus although initially the spray paths from the injector nozzle 20 to the end wall 25 of the recess are short, the end wall 25 is all the time moving away from the injector nozzle so that wetting of the end wall is minimal. At low rotor speeds, the main part of the sprayed jets may eventually overtake the advancing end wall 25 but not before ignition has occurred. Subsequent fuel penetration in the presence of the flame is reduced, and wall wetting can thereby be avoided.

Figure 3:
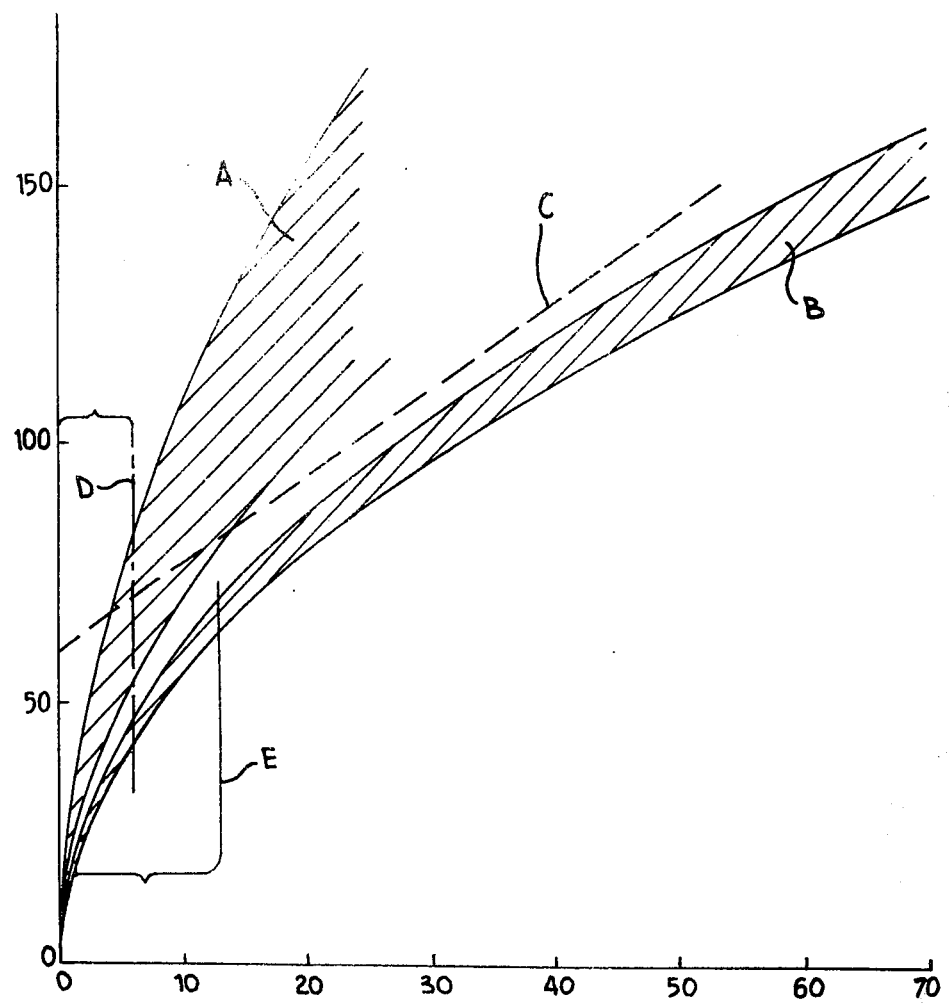
FIG. 3 is a diagram showing graphically the curves of spray tip penetration plotted against a time base, for two different rotor speeds.

FIG. 3 is a graph showing the penetration distance (in mm) of the initial portion of liquid fuel sprayed into the recess, plotted against a crank-angle time base (crank degrees). Two families of curves A and B are shown, respectively for rotor speeds of 1000 and 4500 revolution/minute respectively. The motion of the recess end wall 25 is represented by the straight line C. For curves A the ignition point is shown at D, and for curves B at E. It will be seen that at 1000 r.p.m. rotor speed the bulk of the leading fuel will not have reached the end wall 25 before ignition occurs, whilst at 4500 r.p.m none of this fuel will ever reach the end wall 25.

It will be clear that each flank 12 of the rotor 10 will be provided with one of the described combustion recesses 11. Moreover in a twin-rotor machine each rotor will be provided with the recesses 11.

What is claimed is:

1. A rotary piston compression-ignition internal combustion engine comprising: a housing defining a main chamber comprising $n$ lobes; a shaft extending axially of the housing; a rotor defined by an $(n + 1)$ sided piston having flanks defining its sides, said piston being eccentrically mounted on the shaft and rotatable in the housing; a seal mounted at each apex formed between each pair of adjacent flanks of the piston; a combustion recess formed in each flank of the rotor having an end wall at its leading end extending substantially normal to the corresponding rotor flank at its intersection therewith, a substantially plane bottom wall which extends substantially at right angles to the leading end wall, and a depth which increases progressively in the direction of rotation of the rotor; and means for injecting fuel into each recess disposed in the housing and arranged to inject one or more sprays of fuel into the combustion recess, the direction of injection of the spray or sprays being essentially towards the leading end wall of the recess in the direction of rotation.

2. A rotary piston compression-ignition internal combustion engine as claimed in claim 1, in which the housing wall adjacent the nozzle of the injection means is cut away to facilitate the passage of the spray or sprays into the combustion recess.

3. A rotary piston compression-ignition internal combustion engine as claimed in claim 1, in which the depth of each combustion recess increases progressively from zero at the lagging end of the recess in the direction of rotation of the rotor.

4. A rotary piston compression-ignition internal combustion engine as claimed in claim 1, in which each combustion recess is disposed substantially midway between the ends of the associated flank.

5. A rotary piston compression-ignition internal combustion engine as claimed in claim 1, in which timing means are provided for controlling operation of the fuel injection means in dependence upon the position of the appropriate combustion recess whereby to minimize fuel wetting of the walls of the recess at low rotor speeds and avoid it at high rotor speeds.

6. A rotary piston compression-ignition internal combustion engine as claimed in claim 1 in which $n$ equals 2.

* * * * *

UNITED STATES PATENT OFFICE
CERTIFICATE OF CORRECTION

Patent No. 3,929,106     Dated December 30, 1975

Inventor(s) William M. SCOTT

It is certified that error appears in the above-identified patent and that said Letters Patent are hereby corrected as shown below:

Please amend [73] to read

Assignee: Rolls-Royce Motors Limited, Crewe, England

Signed and Sealed this second Day of March 1976

[SEAL]

Attest:

RUTH C. MASON
Attesting Officer

C. MARSHALL DANN
Commissioner of Patents and Trademarks